（12） United States Patent
Naya

(10) Patent No.: US 6,426,491 B2
(45) Date of Patent: *Jul. 30, 2002

(54) MICRO-APERTURE PROBE EVALUATING APPARATUS HAVING A DISPLAY AND A COLLIMATING OPTICAL SYSTEM

(75) Inventor: Masayuki Naya, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/817,236

(22) Filed: Mar. 27, 2001

Related U.S. Application Data

(62) Division of application No. 09/160,346, filed on Sep. 25, 1998, now Pat. No. 6,232,588.

(30) Foreign Application Priority Data

Sep. 26, 1997 (JP) .............................................. 9-261958
Sep. 26, 1997 (JP) .............................................. 9-261959

(51) Int. Cl.$^7$ ................................................ G02B 7/04
(52) U.S. Cl. ................................. 250/201.3; 250/208.1; 250/216
(58) Field of Search .......................... 250/201.3, 208.1, 250/216, 234, 235, 225, 306, 307

(56) References Cited

U.S. PATENT DOCUMENTS

| 5,389,779 | A |   | 2/1995 | Betzig et al. ................ 250/216 |
| 5,548,113 | A |   | 8/1996 | Goldberg et al. ............ 250/234 |
| 5,663,798 | A | * | 9/1997 | Karrai ........................ 356/384 |
| 6,043,485 | A |   | 3/2000 | Naya ........................... 250/234 |

* cited by examiner

Primary Examiner—Que T. Le
(74) Attorney, Agent, or Firm—Sughrue Mion, PLLC

(57) ABSTRACT

A sample analyzing apparatus includes a micro-aperture probe, which is provided with a light passage aperture having a diameter shorter than wavelengths of light, the light passage aperture being formed at a radiating end of the micro-aperture probe, and a light source, which produces light for sample analysis. An incidence optical system causes the light for sample analysis to enter into the micro-aperture probe from an entry end of the micro-aperture probe. A sample supporting member supports a sample at a position that is exposed to near field light radiated out of the radiating end of the micro-aperture probe. An image sensor receives light scattered by the sample and detects an intensity distribution pattern of the scattered light. A display device displays the detected intensity distribution pattern.

5 Claims, 2 Drawing Sheets

MICRO-APERTURE PROBE EVALUATING APPARATUS HAVING A DISPLAY AND A COLLIMATING OPTICAL SYSTEM

This is a divisional of application Ser. No. 09/160,346 filed Sep. 25, 1998, now U.S. Pat. No. 6,232,588, the disclosure of which is incorporated herein by reference.

BACKGROUND OF THE INVENTION

1. Field of the Invention

This invention relates to an apparatus for analyzing a sample by the utilization of near field light, which is radiated out of a micro-aperture probe. This invention also relates to an apparatus for evaluating the performance of a micro-aperture probe, which is used in a near field optical microscope, or the like.

2. Description of the Prior Art

As apparatuses capable of analyzing the shape or structure of a sample smaller than wavelengths of light, near field optical microscopes, such as photon scanning tunnel microscopes, have heretofore been used. The near field optical microscopes are constituted such that, for example, near field light radiated out of a micro-aperture probe may be scattered by a sample, and the intensity of the scattered light may be detected. Also, the micro-aperture probe is scanned, and a time series detection signal representing the intensity of the scattered light is taken as a function of the position of the micro-aperture probe. In this manner, information, which represents the shape or structure of the sample, is obtained.

Ordinarily, in order for the micro-aperture probe to be formed, a radiating end portion of an optical fiber is pointed with an etching process, and a metal film is then deposited on the pointed radiating end portion with a vacuum evaporation process. Thereafter, a portion of the metal film at the pointed end is removed, and an aperture is thereby formed at the pointed end.

With the near field optical microscopes having the constitution described above, the micro-aperture probe must be scanned, and the signal, which represents the position of the probe during the scanning, must be obtained. Therefore, the aforesaid near field optical microscopes has a drawback in that the structures cannot be kept simple.

SUMMARY OF THE INVENTION

The primary object of the present invention is to provide a sample analyzing apparatus, with which a shape or a structure of a sample shorter than wavelengths of light is capable of being analyzed and which has a simple constitution.

Another object of the present invention is to provide a micro-aperture probe evaluating apparatus, with which the performance of a micro-aperture probe (specifically, a distribution pattern of intensity of near field light radiated out of the micro-aperture probe), an optimum state of polarization of incident light, and the like, are capable of being evaluated accurately and easily.

The present invention provides a sample analyzing apparatus, comprising:
i) a probe of the same type as that used in a near field optical microscope, i.e. a micro-aperture probe, which is provided with a light passage aperture having a diameter shorter than wavelengths of light, the light passage aperture being formed at a radiating end of the micro-aperture probe,
ii) a light source, which produces light for sample analysis,
iii) an incidence optical system, which causes the light for sample analysis to enter into the micro-aperture probe from an entry end of the micro-aperture probe,
iv) a sample supporting member, which supports a sample at a position that is exposed to near field light radiated out of the radiating end of the micro-aperture probe,
v) an image sensing means, which receives light scattered by the sample and detects an intensity distribution pattern of the scattered light, and
vi) a displaying means, which displays the detected intensity distribution pattern.

The present invention also provides a sample analyzing apparatus, comprising:
i) a micro-aperture probe, which is provided with a light passage aperture having a diameter shorter than wavelengths of light, the light passage aperture being formed at a radiating end of the micro-aperture probe,
ii) a light source, which produces light for sample analysis,
iii) an incidence optical system, which causes the light for sample analysis to enter into the micro-aperture probe from an entry end of the micro-aperture probe,
iv) a sample supporting member, which supports a sample at a position that is exposed to near field light radiated out of the radiating end of the micro-aperture probe,
v) an image sensing means, which receives fluorescence produced by the sample exposed to the near field light and detects an intensity distribution pattern of the fluorescence, and
vi) a displaying means, which displays the detected intensity distribution pattern.

The intensity of the scattered light or the fluorescence described above is markedly low. Therefore, in the sample analyzing apparatuses in accordance with the present invention, an image sensing means having a high sensitivity, e.g. a cooled CCD image sensor, should preferably be employed.

The present invention further provides a micro-aperture probe evaluating apparatus for evaluating the performance of a micro-aperture probe, which is provided with a light passage aperture having a diameter shorter than wavelengths of light, the light passage aperture being formed at a radiating end of the micro-aperture probe, the apparatus comprising:
i) a light source, which produces light for evaluation,
ii) an incidence optical system, which causes the light for evaluation to enter into the micro-aperture probe from an entry end of the micro-aperture probe (i.e., from an end on the side opposite to the radiating end at which the light passage aperture is formed),
iii) an image sensing means, which receives traveling light radiated out of the radiating end of the micro-aperture probe and detects an intensity distribution pattern of the traveling light in a plane that intersects with a direction of travel of the traveling light, and
iv) a displaying means, which displays the detected intensity distribution pattern.

The micro-aperture probe evaluating apparatus in accordance with the present invention should preferably be provided with a collimating optical system, which collimates the traveling light radiated out of the radiating end of the micro-aperture probe and causes the collimated traveling light to impinge upon the image sensing means.

Also, the collimating optical system should preferably be combined with an image forming optical system for separating a portion of the collimated traveling light, converging the separated portion of the collimated traveling light, and thereby forming an image of the traveling light radiated out of the radiating end of the micro-aperture probe.

Further, the micro-aperture probe evaluating apparatus in accordance with the present invention should preferably be provided with a polarization control means for controlling a state of polarization of the light for evaluation, which enters into the micro-aperture probe. Alternatively, the micro-aperture probe evaluating apparatus in accordance with the present invention may be provided with means for detecting a state of polarization of the traveling light, which has been radiated out of the radiating end of the micro-aperture probe.

The intensity of the traveling light radiated out of the radiating end of the micro-aperture probe is markedly low. Therefore, in the micro-aperture probe evaluating apparatus in accordance with the present invention, an image sensing means having a high sensitivity, e.g. a cooled CCD image sensor, should preferably be employed.

The sample analyzing apparatuses in accordance with the present invention have the effects described below. Specifically, the scattered light or the fluorescence described above has an inherent intensity distribution pattern in accordance with the structure of the sample smaller than wavelengths of light. Therefore, in cases where the intensity distribution pattern with respect to each sample structure is investigated previously, the sample structure can be predicted in accordance with the displayed intensity distribution pattern of the scattered light or the fluorescence.

The micro-aperture probe evaluating apparatus in accordance with the present invention has the effects described below.

Specifically, it has been known that there is a correlation in intensity distribution pattern between the traveling light and the near field light, which are radiated out of the radiating end of the micro-aperture probe. The correlation can be found with an electromagnetic analysis utilizing a Bethe's calculation formula, or the like. Also, the intensity distribution pattern of the near field light can be viewed directly with a near field optical microscope. Therefore, the correlation between the viewed pattern and the intensity distribution pattern of the traveling light can be found previously.

With the micro-aperture probe evaluating apparatus in accordance with the present invention, the intensity distribution pattern of the traveling light, which has been radiated out of the radiating end of the micro-aperture probe, can be detected by the image sensing means and displayed on the displaying means. The intensity distribution pattern of the near field light can then be found in accordance with the displayed pattern and the aforesaid correlation, which has been found previously, and the performance of the probe can thereby be evaluated.

As described above, in the micro-aperture probe evaluating apparatus in accordance with the present invention, the traveling light, which has been radiated out of the radiating end of the micro-aperture probe may be collimated by the collimating optical system, and the collimated traveling light may be caused to impinge upon the image sensing means. In such cases, the intensity distribution pattern of the traveling light can be viewed directly.

Also, the collimating optical system may be combined with the image forming optical system for separating a portion of the collimated traveling light, converging the separated portion of the collimated traveling light, and thereby forming an image of the traveling light radiated out of the radiating end of the micro-aperture probe. In such cases, adjustment of a focusing point can be carried out by viewing the image, which is formed by the image forming optical system. Therefore, the traveling light can be collimated accurately.

Further, the micro-aperture probe evaluating apparatus in accordance with the present invention may be provided with the polarization control means for controlling a state of polarization of the light for evaluation, which enters into the micro-aperture probe, or the means for detecting the state of polarization of the traveling light, which has been radiated out of the radiating end of the micro-aperture probe. In such cases, it becomes possible to find the state of polarization of the traveling light, which yields an optimum intensity distribution pattern of the traveling light (and, consequently, an optimum intensity distribution pattern of the near field light).

DESCRIPTION OF THE PREFERRED EMBODIMENTS

The present invention will hereinbelow be described in further detail with reference to the accompanying drawings.

Figure 1:
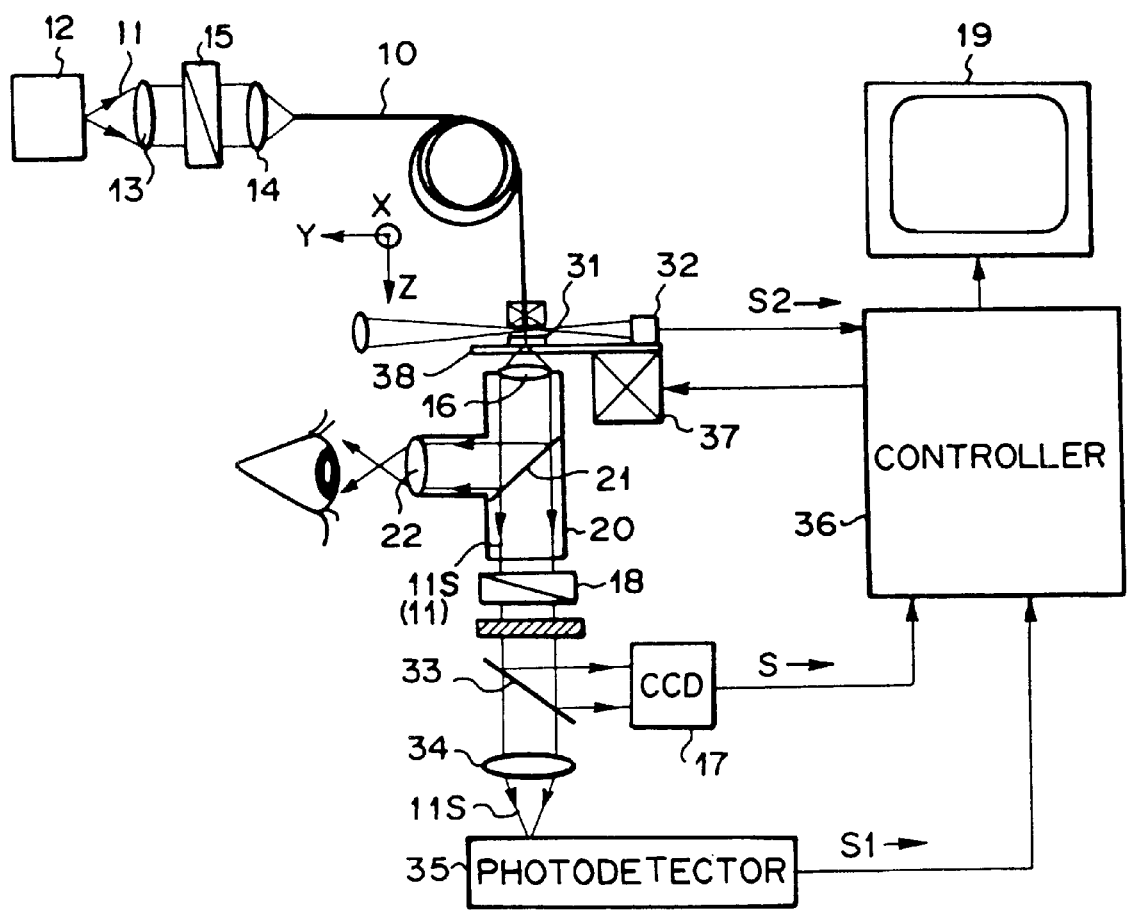
FIG. 1 is a side view showing an embodiment of the sample analyzing apparatus in accordance with the present invention.

FIG. 1 shows an embodiment of the sample analyzing apparatus in accordance with the present to invention.

With reference to FIG. 1, the sample analyzing apparatus comprises a micro-aperture probe 10, which is of the same type as that used in a near field optical microscope, and a laser 12, which produces light (a laser beam) 11 for sample analysis. The sample analyzing apparatus also comprises a collimator lens 13 for collimating the laser beam 11, which is divergent light, and a converging lens 14 for converging the collimated laser beam 11 at an entry end of the micro-aperture probe 10 (i.e., at its left end in FIG. 1). The sample analyzing apparatus further comprises a half-wave plate 15, which is located between the collimator lens 13 and the converging lens 14 and serves as a polarization control device.

By way of example, the micro-aperture probe 10 is constituted of an optical fiber and has a pointed radiating end (the lower end in FIG. 1). The radiating end of the micro-aperture probe 10 has a light passage aperture, which has a diameter shorter than wavelengths of light. The laser beam 11, which has been converged at the entry end of the micro-aperture probe 10 in the manner described above, enters into the micro-aperture probe 10 from the entry end, travels through the micro-aperture probe 10, and is radiated out of the light passage aperture of the radiating end.

At this time, near field light, which is an evanescent wave, is also radiated out of the light passage aperture of the micro-aperture probe 10. When a sample 31 to be subjected to analysis is supported on a sample supporting member 38 and placed in the near field light, scattered light 11S occurs. A converging lens 16 for collecting the scattered light 11S is located at the position, upon which the scattered light 11S impinges. Also, a beam splitter 21 separates a portion of the collected scattered light 11S. The scattered light 11S, which has been reflected from the beam splitter 21, is guided to an image forming lens 22.

The scattered light 11S, which has passed through the beam splitter 21, passes through an analyzer 18 and impinges upon a beam splitter 33. A portion of the scattered light 11S is reflected and separated by the beam splitter 33. The separated portion of the scattered light 11S impinges upon a cooled CCD image sensor 17. The scattered light 11S, which has passed through the beam splitter 33, is converged by a converging lens 34 and guided to a photodetector 35. A photo detection signal S1, which is obtained from the photodetector 35, is fed into a controller 36.

The sample supporting member 38 can be moved in X, Y, and Z directions by a driving means 37, which may be constituted of a piezo-electric device, or the like. Therefore, the sample supporting member 38 can be scanned in the X and Y directions with respect to the micro-aperture probe 10, and the photo detection signal S1, which represents the intensity of the scattered light 11S occurring at each scanning position, can be detected as a function of the position of the sample. supporting member 38. The thus obtained function represents the distribution of the evanescent field. Therefore, from the obtained function, information representing the shape and structure of the sample 31 can be obtained.

The driving means 37 is controlled by the controller 36. The position of the micro-aperture probe 10 with respect to the optical axis direction is detected by a position detecting device 32. A position detection signal S2, which has been obtained from the position detecting device 32, is fed into the controller 36. In accordance with the position detection signal S2, the controller 36 controls the driving means 37 such that the position of the sample supporting member 38 (and, consequently, the position of the sample 31) with respect to the Z direction may be set at a desired position.

The scattered light 11S, which has been reflected from the beam splitter 33 before being converged by the converging lens 34, impinges upon the cooled CCD image sensor 17. The cooled CCD image sensor 17 detects the intensity distribution pattern of the scattered light 11S and generates an image signal S, which represents the intensity distribution pattern of the scattered light 11S. The image signal S is fed into the controller 36 and subjected to predetermined image processing in an image processing unit of the controller 36. The image signal, which has been obtained from the image processing, is fed into an image displaying means 19. The intensity distribution pattern of the scattered light 11S is displayed on the image displaying means 19.

The intensity of the scattered light 11S is markedly low. However, in this embodiment, the cooled CCD image sensor 17, which has a markedly high sensitivity, is employed as the image sensing means. Therefore, the intensity distribution pattern of the weak scattered light 11S can be detected clearly.

Ordinarily, the scattered light 11S has an inherent intensity distribution pattern in accordance with the structure of the sample 31 smaller than wavelengths of light. Therefore, an intensity distribution pattern with respect to each sample structure may be investigated previously, and the sample structure can thereby be predicted in accordance with the displayed intensity distribution pattern of the scattered light 11S.

In this embodiment, the direction of linear polarization of the laser beam 11 before entering into the micro-aperture probe 10 can be altered by rotating the half-wave plate 15. Also, the direction of polarization can be ascertained with the analyzer 18. In this manner, the state of polarization, which is appropriate for the sample analysis, can be set.

Also, this embodiment is provided with the beam splitter 21 for separating a portion of the laser beam (traveling light) 11, which has been radiated out of the radiating end of the micro-aperture probe 10 and has then been collimated by the converging lens 16. The embodiment is further provided with the image forming lens 22 for converging the separated portion of the laser beam 11 and forming an image of the laser beam 11 radiated out of the radiating end of the micro-aperture probe 10. The converging lens 16, the beam splitter 21, and the image forming lens 22 are supported by a lens tube 20. The lens tube 20 can be moved by a driving means (not shown) in the optical axis direction Z and in the X and Y directions, which are normal to the optical axis direction Z.

Therefore, the operator can see the image, which is formed by the image forming lens 22, and can thereby move the lens tube 20 in the three-dimensional directions. In this manner, the operator can retain the lens tube 20 at a position such that the image at the radiating end of the micro-aperture probe 10 may be viewed clearly.

In cases where the sample 31 is capable of producing the fluorescence when it is exposed to the near field light, the intensity distribution pattern of the fluorescence can be detected by the cooled CCD image sensor 17 and displayed on the image displaying means 19. ordinarily, the fluorescence has an inherent intensity distribution pattern in accordance with the structure of the sample 31 smaller than wavelengths of light. Therefore, an intensity distribution pattern of the fluorescence with respect to each sample structure may be investigated previously, and the sample structure can thereby be predicted in accordance with the displayed intensity distribution pattern of the fluorescence.

Figure 2:
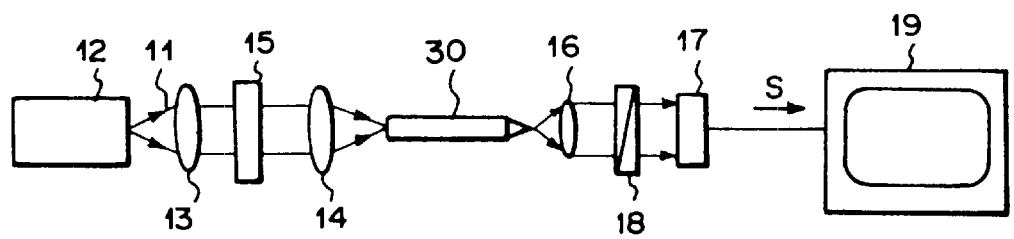
FIG. 2 is a side view showing a first embodiment of the micro-aperture probe evaluating apparatus in accordance with the present invention.

Embodiments of the micro-aperture probe evaluating apparatus in accordance with the present invention will be described hereinbelow. FIG. 2 shows a first embodiment of the micro-aperture probe evaluating apparatus in accordance with the present invention.

The probe evaluating apparatus shown in FIG. 2 is used for evaluating the performance of a micro-aperture probe 30, which is utilized in a near field optical microscope, or the like. The probe evaluating apparatus comprises a laser 12, which produces light (a laser beam) 11 for evaluation. The probe evaluating apparatus also comprises a collimator lens 13 for collimating the laser beam 11, which is divergent light, and a converging lens 14 for converging the collimated laser beam 11 at the entry end of the micro-aperture probe 30 (i.e., at its left end in FIG. 2). The probe evaluating apparatus further comprises a half-wave plate 15, which is located between the collimator lens 13 and the converging lens 14 and serves as a polarization control device.

By way of example, the micro-aperture probe 30 is constituted of an optical fiber and has a pointed radiating end (the right end in FIG. 2). The radiating end of the micro-aperture probe 30 has a light passage aperture, which has a diameter shorter than wavelengths of light. The laser beam 11, which has been converged at the entry end of the micro-aperture probe 30 in the manner described above, enters into the micro-aperture probe 30 from the entry end, travels through the micro-aperture probe 30, and is radiated as divergent light out of the light passage aperture of the radiating end.

At this time, together with the laser beam 11, which is the ordinary traveling light, near field light is radiated out of the light passage aperture of the micro-aperture probe 30. In a near field optical microscope, or the like, the near field light is utilized for the observation, analysis, processing, or the like, of a sample. However, in the probe evaluation, the near field light is not utilized directly.

A collimator lens 16 for collimating the laser beam 11 is located at the position, upon which the laser beam (traveling light) 11 having been radiated as divergent light out of the light passage aperture of the micro-aperture probe 30 impinges. Also, a cooled CCD image sensor 17 is located at the position, upon which the laser beam 11 having been collimated by the collimator lens 16 impinges. An analyzer 18 is located between the collimator lens 16 and the cooled CCD image sensor 17. An image signal S, which is obtained from the cooled CCD image sensor 17, is fed into an image displaying means 19, which may be constituted of a cathode ray tube (CRT) display device.

When evaluation of the performance of the micro-aperture probe 30 is to be made, the laser beam 11 is caused to enter into the micro-aperture probe 30 in the manner described above. The laser beam (traveling light) 11 is radiated out of the micro-aperture of the micro-aperture probe 30. The radiated laser beam 11 is received by the cooled CCD image sensor 17. At this time, the laser beam 11 impinges upon the cooled CCD image sensor 17 as the collimated light such that the beam axis may be normal to the light receiving surface of the cooled CCD image sensor 17. Therefore, the intensity distribution pattern in the beam cross-section of the laser beam 11 is detected by the cooled CCD image sensor 17. The image signal S, which represents the intensity distribution pattern, is fed into the image displaying means 19, and the intensity distribution pattern is displayed on the image displaying means 19.

The intensity of the laser beam 11, which is the traveling light and has been radiated out of the light passage aperture of the micro-aperture probe 30, is markedly low. However, in this embodiment, the cooled CCD image sensor 17, which has a markedly high sensitivity, is employed as the image sensing means. Therefore, the intensity distribution pattern of the weak laser beam 11 can be detected clearly.

As described above, there is correlation in intensity distribution pattern between the traveling light and the near field light, which are radiated out of the radiating end of the micro-aperture probe 30. Therefore, the correlation is found previously, and the intensity distribution pattern of the near field light can be found from the intensity distribution pattern of the laser beam (traveling light) 11 displayed on the image displaying means 19. In this manner, the performance of the micro-aperture probe 30 can be evaluated.

In this embodiment, the direction of linear polarization of the laser beam 11 before entering into the micro-aperture probe 30 can be altered by rotating the half-wave plate 15. Also, the direction of polarization can be ascertained with the analyzer 18. In this manner, the intensity distribution pattern of the laser beam 11 having been radiated out of the micro-aperture can be ascertained. Accordingly, the state of polarization, which yields the optimum intensity distribution pattern of the traveling light (and, consequently, the near field light), can be found.

Figure 3:
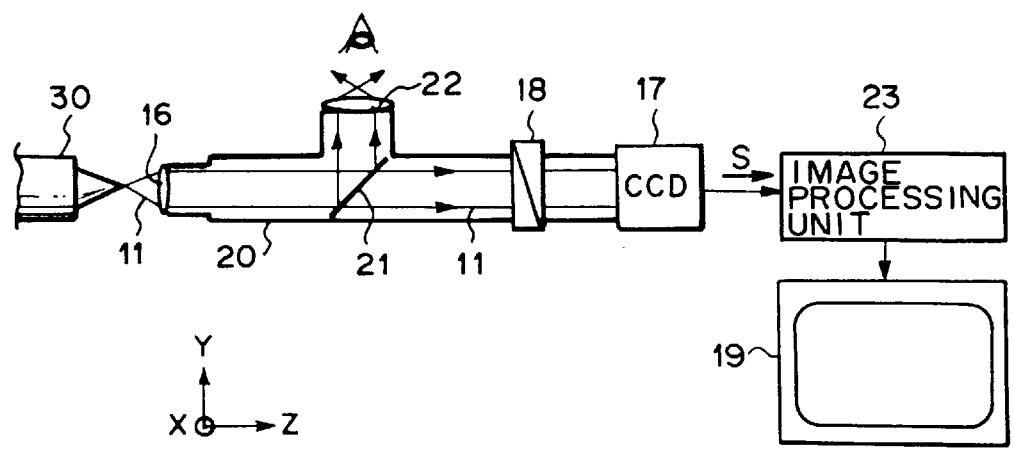
FIG. 3 is a side view showing part of a second embodiment of the micro-aperture probe evaluating apparatus in accordance with the present invention.

A second embodiment of the micro-aperture probe evaluating apparatus in accordance with the present invention will be described hereinbelow with reference to FIG. 3. Basically, the second embodiment is similar to the first embodiment of FIG. 2, except for the collimating optical system. Therefore, in FIG. 3, only the collimating optical system and the subsequent portion are shown. In FIG. 3, similar elements are numbered with the same reference numerals with respect to FIG. 2.

In the second embodiment, the collimating optical system is combined with a beam splitter 21 for separating a portion of the laser beam 11, which has been radiated out of the radiating end of the micro-aperture probe 30 and has then been collimated by the collimator lens 16, and an image forming lens 22 for converging the separated portion of the laser beam 11 and forming an image of the laser beam 11 radiated out of the radiating end of the micro-aperture probe 30.

The collimator lens 16, the beam splitter 21, the image forming lens 22, the analyzer 18, and the cooled CCD image sensor 17 are supported by a lens tube 20. The lens tube 20 can be moved by a driving means (not shown) in the optical axis direction Z and in the X and Y directions, which are normal to the optical axis direction Z. When the laser beam 11 impinges as the collimated light upon the image forming lens 22, the image forming lens 22 forms the image of the laser beam 11 radiated out of the radiating end of the micro-aperture probe 30.

Therefore, the operator can see the image, which is formed by the image forming lens 22, and can thereby move the lens tube 20 in the three-dimensional directions. In this manner, the operator can retain the lens tube 20 at a position such that the image at the radiating end of the micro-aperture probe 30 may be viewed clearly. As a result, the laser beam 11, which is the traveling light, can be reliably caused to impinge as the collimated light upon the cooled CCD image sensor 17.

In the second embodiment, as in the first embodiment of the probe evaluating apparatus, the intensity distribution pattern of the laser beam (traveling light) 11 can be displayed on the image displaying means 19 in accordance with the image signal S, which has been obtained from the cooled CCD image sensor 17. Also, the intensity distribution pattern of the near field light can be found from the intensity distribution pattern of the laser beam 11 displayed on the image displaying means 19. In this manner, the performance of the micro-aperture probe 30 can be evaluated.

In the second embodiment, the image signal S, which has been obtained from the cooled CCD image sensor 17, is fed into an image processing unit 23 and subjected to predetermined image processing. The image signal, which has been obtained from the image processing, is fed into the image displaying means 19.

A third embodiment of the micro-aperture probe evaluating apparatus in accordance with the present invention will be described hereinbelow with reference to FIG. 1. The third embodiment is built in the near field optical microscope and is provided with the micro-aperture probe 10, which may be constituted of a long optical fiber. The micro-aperture probe 10 takes on the form such that it can be processed in the same manner as an ordinary optical fiber having flexibility. The basic constitution and effects of the micro-aperture probe 10 are the same as those of the micro-aperture probe 30 described above.

Also, in the third embodiment, the beam splitter 33 is located in the optical path of the laser beam 11 having passed through the analyzer 18. The laser beam 11, which is the traveling light, is reflected from the beam splitter 33 and guided to the cooled CCD image sensor 17.

As described above, together with laser beam 11, which is the traveling light, near field light, which is an evanescent wave, is radiated out of the radiating end (i.e. the lower end in FIG. 1) of the micro-aperture probe 10. When the sample 31 is placed in the near field light, the scattered light 11S occurs. The scattered light 11S is converged by the converging lens 34 and guided to the photodetector 35. The photo detection signal S1, which is obtained from the photodetector 35, is fed into the controller 36.

In the third embodiment, as in the first and second embodiments of the probe evaluating apparatus in accordance with the present invention, the intensity distribution pattern of the laser beam (traveling light) 11 can be displayed on the image displaying means 19 in accordance with the image signal S, which has been obtained from the cooled CCD image sensor 17. Also, the intensity distribution pattern of the near field light can be found from the intensity distribution pattern of the laser beam 11 displayed on the image displaying means 19. In this manner, the performance of the micro-aperture probe 10 can be evaluated.

In the third embodiment, the image signal S, which has been obtained from the cooled CCD image sensor 17, is fed into the controller 36. Predetermined image processing is carried out on the image signal S by the image processing unit, which is provided in the controller 36. The image signal, which has been obtained from the image processing, is fed into the image displaying means 19.

Also, in the third embodiment, the operator can see the image, which is formed by the image forming lens 22, and can thereby move the lens tube 20 in the three-dimensional directions. In this manner, the operator can retain the lens tube 20 at a position such that the image at the radiating end of the micro-aperture probe 10 may be viewed clearly. As a result, the laser beam 11, which is the traveling light, can be reliably caused to impinge as the collimated light upon the cooled CCD image sensor 17.

What is claimed is:

1. A micro-aperture probe evaluating apparatus for evaluating performance of a micro-aperture probe, which is provided with a light passage aperture having a diameter shorter than wavelengths of light, said light passage aperture being formed at a radiating end of said micro-aperture probe, the apparatus comprising:

i) a light source which produces light for evaluation, ii) an incidence optical system which causes the light for evaluation to enter into said micro-aperture probe from an entry end of said micro-aperture probe, iii) an image sensing means for receiving traveling light radiated out of the radiating end of said micro-aperture probe and detecting an intensity distribution pattern of the traveling light in a plane that intersects with a direction of travel of the traveling light, and iv) a displaying device which displays the detected intensity distribution pattern, wherein the apparatus is further provided with a collimating optical system, which collimates the traveling light radiated out of the radiating end of said micro-aperture probe and causes the collimated traveling light to impinge upon said image sensing means.

2. The micro-aperture probe evaluating apparatus as defined in claim 1, wherein said collimating optical system is combined with an image forming optical system for separating a portion of the collimated traveling light, converging the separated portion of the collimated traveling light, and thereby forming an image of the traveling light radiated out of the radiating end of said micro-aperture probe.

3. The micro-aperture probe evaluating apparatus as defined in claim 1, wherein the apparatus is further provided with a polarization control means for controlling a state of polarization of the light for evaluation, which enters into said micro-aperture probe.

4. The micro-aperture probe evaluating apparatus as defined in claim 1, wherein the apparatus is further provided with means for detecting a state of polarization of the traveling light, which has been radiated out of the radiating end of said micro-aperture probe.

5. The micro-aperture probe evaluating apparatus as defined in claim 1, wherein a cooled CCD image sensor is employed as said image sensing means.

* * * * *